United States Patent [19]

Moore

[11] Patent Number: 5,079,803
[45] Date of Patent: Jan. 14, 1992

[54] BIODEGRADABLE STRAPS FOR BUNDLING RECYCLABLE PAPER MATERIALS

[76] Inventor: Eugene J. Moore, 49 W. 11th St., #23, New York, N.Y. 10011

[21] Appl. No.: 602,171

[22] Filed: Oct. 23, 1990

[51] Int. Cl.⁵ .............................................. B65D 63/00
[52] U.S. Cl. ........................................ 24/16 R; 24/17 A
[58] Field of Search ................. 24/16 R, 16 PB, 17 A, 24/17 AP, 17 P; 206/442, 83.5

[56] References Cited

U.S. PATENT DOCUMENTS

| | | | |
|---|---|---|---|
| 161,506 | 3/1875 | Grinsted et al. | 24/17 A |
| 275,723 | 4/1883 | Smith | 24/16 R |
| 815,505 | 3/1906 | Blacker | 24/17 B |
| 1,053,126 | 2/1913 | Fuller et al. | 24/17 A |
| 1,192,152 | 7/1916 | Atkinson | 24/17 A |
| 1,349,857 | 8/1920 | Salop | 24/17 A |
| 1,993,355 | 3/1935 | Beller | 24/17 A |
| 2,004,098 | 6/1935 | Andrews | 24/17 A |
| 2,268,845 | 1/1942 | Powers | 24/17 A |
| 3,330,409 | 7/1967 | Jorgensen | 206/83.5 |
| 5,022,316 | 6/1991 | Hellwig | 206/83.5 |

FOREIGN PATENT DOCUMENTS

| | | | |
|---|---|---|---|
| 971779 | 1/1951 | France | 24/16 R |
| 1056063 | 2/1954 | France | 24/17 AP |
| 1278571 | 10/1961 | France | 24/16 PB |
| 12577 | 3/1915 | United Kingdom | 24/17 A |
| 698696 | 10/1953 | United Kingdom | 24/17 AP |
| 1097213 | 1/1968 | United Kingdom | 24/16 PB |

*Primary Examiner*—Victor N. Sakran
*Attorney, Agent, or Firm*—Anthony J. Casel; Gerald E. Hespos

[57] ABSTRACT

A biodegradable strap is provided for bundling a stack of paper recyclables. The strap includes first and second end portions and a center portion. The first and second end portions have a locking means for securely fastening the strap around a stack of paper recyclables. The center portion may include means for cross-linking two identical bundling straps.

8 Claims, 2 Drawing Sheets

BIODEGRADABLE STRAPS FOR BUNDLING RECYCLABLE PAPER MATERIALS

BACKGROUND OF THE INVENTION

Binding of recyclable paper materials, including newspapers, magazines and corrugated cardboard has become necessary with the advent of systematic curbside collection in many metropolitan areas. There are a number of reasons why sanitation departments in most cities require paper materials to be bundled and tied. First, this method keeps the materials free of contaminants. It also allows for quick observation from collection personnel to determine proper recycling materials. Finally, vendors and end users are reluctant to accept papers unless it is bundled or baled.

It has become commonplace to bundle recyclable paper materials with twine so as to restrict the scattering of papers in the streets. It is an environmentally sound method of packaging. Unfortunately, however, there are tenants, cooperators, superintendents, owners and managers who are unwilling or unable to bundle and tie their paper recyclables. Many individuals resent the personal outlay of money for twine and the additional labor of tying. Many elderly and infirm people legitimately find it difficult to tie twine.

An alternative mechanism of packaging is the use of paper or plastic bags. However, the garbage bags that are generally used are plastic and, hence not biodegradable, thus not particularly suited for recycling. Furthermore, collection personnel cannot determine the type of recyclable material within the bags. Therefore, it is necessary to remove the contents of the bags prior to recycling. This added step is costly and time consuming.

It is therefore a primary object of the subject invention to provide a biodegradable means for binding a stack of recyclable paper materials.

It is a further object of the subject invention to provide a biodegradable means for easily and conveniently binding a stack of paper materials.

A further object of the subject invention is to provide a biodegradable means for binding a stack of paper materials that is inexpensive.

SUMMARY OF THE INVENTION

The subject invention is directed to a biodegradable strap for bundling recyclable paper materials. The bundling strap, which is preferably made of cardboard, provides an inexpensive and convenient means of binding a stack of paper recyclables approximately 10.0 inches in height. To bundle a stack of paper recyclables in excess of 10.0 inches in height, two bundling straps may be cross-linked to ensure a more secure bundle.

The bundling strap comprises an elongated strip of biodegradable material having first and second end portions and a central portion. The first and second end portions each include a plurality of spaced apart rectangular slots disposed orthogonal to the longitudinal axis of the strap to define generally square waveform structures along an edge of the bundling strap. The plurality of slots on the first end portion extend inwardly from one edge of the strap whereas the plurality of slots on the second end portion extend inwardly from the opposed edge of the strap. The square waveform structures on the opposed edges of the first and second end portions of the bundling strap are designed to be interengaged so as to securely lock the strap about a stack of paper recyclables. The center portion of the strap may include a pair of spaced apart elongated cross-linking slits disposed equidistant from and parallel to the longitudinal axis of the elongated strap. The cross-linking slits are provided for receiving a second identical strap therethrough.

In operation, the bundling strap of the subject invention is wrapped around a stack of paper recyclables such that the center portion is contiguous with the bottom of the stack and the first and second end portions extend over the top of the stack. Thereafter, the square waveform structures respectively disposed in the opposed edges of the elongated strap are intermeshed at a plurality of locations so as to securely fasten the strap about the stack of paper recyclables.

At such a time, a second strap may be inserted through both of the spaced apart cross-linking slits of the first strap such that the first and second straps are generally perpendicular to each other. Subsequently, the second strap is securely fastened about the stack of papers in the same manner as the first strap.

In an alternate embodiment of the biodegradable bundling strap of the subject invention, the strap comprises an elongated strip of biodegradable material having first and second end portions and a central portion. The first end portion includes a plurality of spaced apart locking slits which are disposed intermediate the strap and orthogonal to the longitudinal axis thereof. The second end portion includes a plurality of spaced apart generally V-shaped notches. The notches are disposed in the opposed edges of the elongated strap and extend inwardly therefrom. The notched portion of the bundling strap is provided to engage the locking slits in the first end portion upon extending the second end portion therethrough. The center portion of the alternate embodiment of the strap may also include a pair of elongated spaced apart cross-linking slits disposed equidistant from and parallel to the longitudinal axis of the elongated strap. The cross-linking slits are provided to permit a second identical strap to extend therethrough.

In operation, the alternate embodiment of the strap of the subject invention is wrapped around a stack of paper recyclables such that the center portion is contiguous with the bottom of the stack and the first and second end portions extend over the top of the stack. Thereafter, the second end portion is extended sufficiently through a locking aperture on the first end portion such that a pair of V-shaped notches are engaged therein, and the bundle of papers is secured.

At such a time, a second strap may be inserted through the pair of cross-linking slits in the central portion of the first strap so that first and second straps are perpendicular to each other as well as interlinked with one another. Subsequently, the second strap is engaged in the same manner as the first strap so as to more securely bundle the stack of paper recyclables.

DETAILED DESCRIPTION OF THE PREFERRED EMBODIMENT

Figure 1:
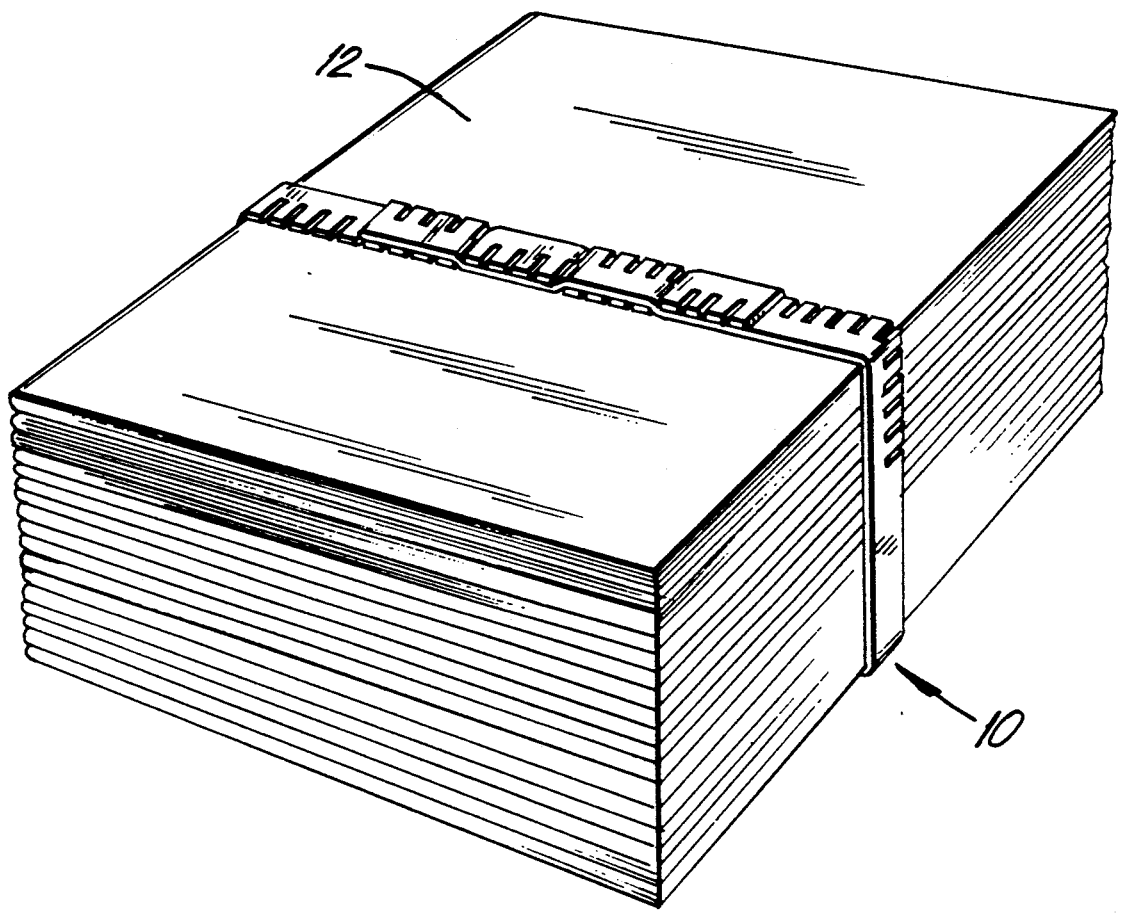
FIG. 1 is a perspective view of the biodegradable bundling strap of the subject invention engaged about a stack of paper recyclables.
Figure 2:
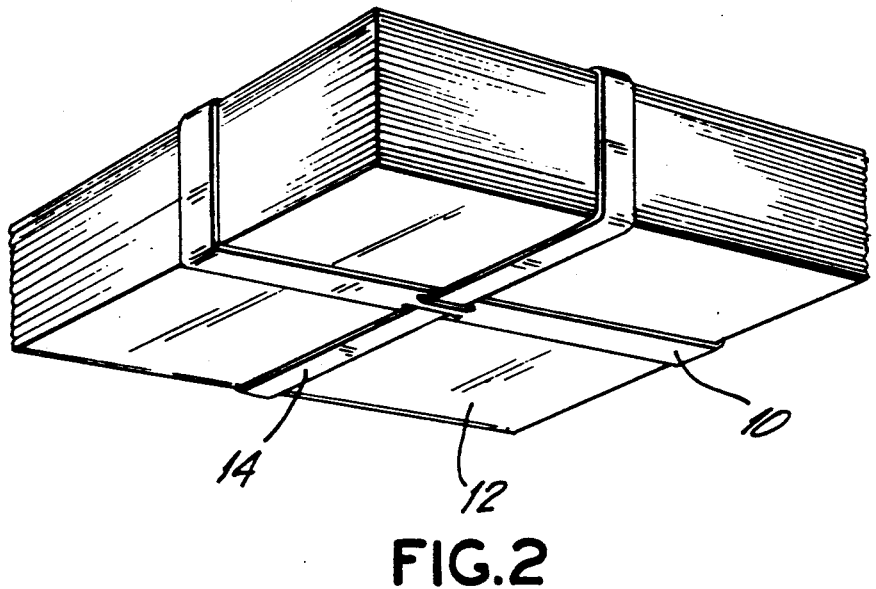
FIG. 2 is a perspective view of two of the biodegradable bundling straps of the subject invention cross-linked on the bottom of a stack of paper recyclables.

The biodegradable strap for bundling recyclable paper materials is illustrated in FIG. 1 and is designated generally by reference numeral 10. The strap 10 of the subject invention is provided to be wrapped around a stack of paper recyclables 12, such as newspapers and magazines, approximately 10.0 inches in height. However, the strap 10 may be modified so as to accommodate a stack of paper recyclables 12 in excess of 18.0 inches, which is the maximum height allowed by city ordinance. Once wrapped around the stack of paper recyclables 12, the strap 10 can be fastened so as to securely bundle the stack of papers 12, thereby preventing them from scattering and promoting their efficient collection. A second identical bundling strap 14 may be cross-linked with the first bundling strap 10, as illustrated in FIG. 2, if a more securely bound bundle of paper recyclables 12 is desired. A plurality of bundling straps 10 may be provided in a continuous roll, wherein each individual strap 10 would be separated by a score line or perforation so as to be readily dispensed.

Figure 3:
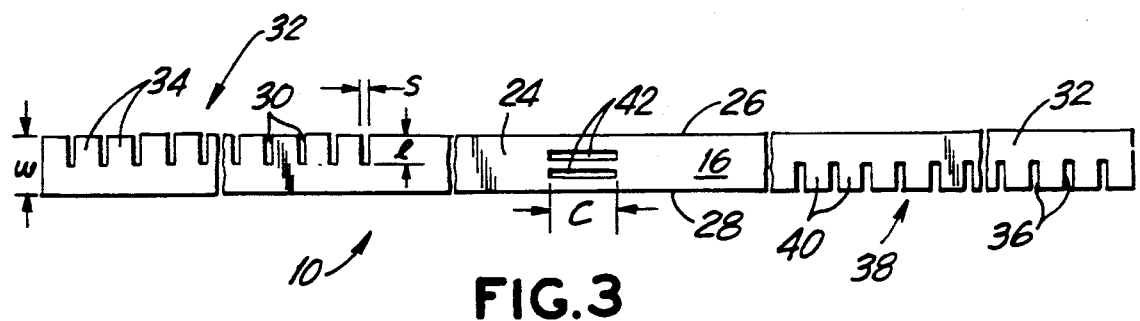
FIG. 3 is a top plan view of the biodegradable bundling strap of the subject invention.
Figure 3A:
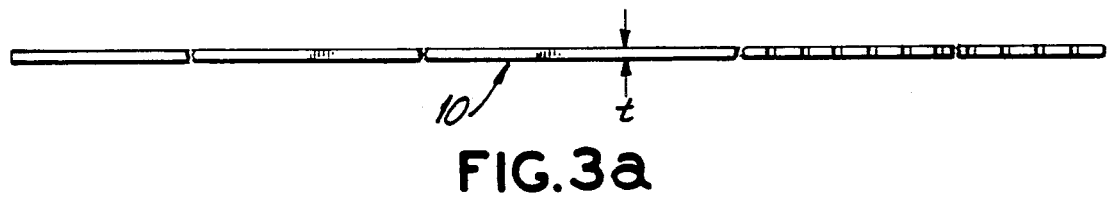
FIG. 3a is a side elevational view of the biodegradable bundling strap of the subject invention.

The details of construction of the biodegradable strap for bundling paper recyclables 10 of the subject invention are illustrated in FIGS. 3 and 3a. The bundling strap 10 comprises an elongated strip of biodegradable material such as fiberboard, linerboard or boxboard, approximately 45.0 inches in length, however, as mentioned above, the strap 10 may be duly modified to a length of approximately 70.0 inches in length. These materials are generally made on multicylinder machines, where layers of fiber are built up to a desired thickness. Interior plys are often made from wastepaper furnishes, while surface plys are made from bleached, virgin fiber. The principal properties of the above mentioned board products are high tensile and bursting strengths, and good tear and fold endurance. Alternatively these materials may combined with a corrugating medium so as to enhance the stiffness of the structure. The bundling strap 10 has a major surface 16 with a width "w" that is equal to 1.0 inch and which is substantially greater than its thickness "t". The bundling strap 10 includes a first end portion 20, a second end portion 22, a center portion 24, and opposed lateral edges 26 and 28.

The first end portion 20 of the bundling strap 10 includes a plurality of spaced apart rectangular slots 30. The plurality of slots 30 are disposed orthogonal to the longitudinal axis of the elongated strap 10 and each extends inwardly from the lateral edge 26 of the strap 10 to a location intermediate the major surface 14 and proximate the longitudinal axis thereof. The slots 30 have a length "l" that is approximately equal to half the width "w" of the bundling strap 10. Each of the slots 30 has a width "s" that is equal to the thickness "t" of the bundling strap 10. The plurality of slots 30 define a generally square waveform structure 32 including a plurality of generally rectangular members 34. The square waveform structure 32 has a length which is approximately equal to one quarter of the total length of the elongated strap 10.

The second end portion 22 of the bundling strap 10 includes a plurality of spaced apart rectangular slots 36 having the same dimensions as the plurality of slots 30 in the first end portion 20. The plurality of slots 36 are also disposed orthogonal to the longitudinal axis of the elongated strap 10. However, the slots 36 extend inwardly from the lateral edge 28 of the strap 10. The plurality of slots 36 also define a generally square waveform structure 38 including a plurality of generally rectangular members 40. The square waveform structure 38 has a length which is approximately equal to one quarter of the total length of the elongated strap 10.

The center portion 24 of the bundling strap 10 may include a pair of elongated cross-linking slits 42. The cross-linking slits 42 are disposed parallel to and equally spaced from the longitudinal axis of the elongated strap 10. The slits 42 have a length "c" which is approximately equal to 1.50 inches which is greater than the width "w" of the strap 10. The slits 42 may be provided so that a second bundling strap 14 may be extended therethrough whereby the first bundling strap 10 and the second bundling strap 14 would be generally perpendicular to the one another (see FIG. 2). Alternatively, the center portion 24 may include a single slit 42 for cross-linking the bundling strap 10 with a second bundling strap 14.

Referring back to FIGS. 1 and 2, in operation the bundling strap 10 of the subject invention is placed under a stack of paper recyclables 12 such that the center portion 24 of the strap 10 is contiguous with the bottom of the stack 12. Thereafter, the first end portion 20 and the second end portion 22 of the strap 10 are wrapped around the stack of papers 12 so that they extend over the top of the stack of papers 12. Subsequently, the first end portion 20 and the second end portion 22 are manipulated such that the opposed lateral edges 26 and 28 of the bundling strap 10 are adjacent to one another. At such a time, the first end portion 20 and the second end portion 22 of the strap 10 are urged into intimate relationship with one another by engaging one of the rectangular members 34 on the first end portion 20 with one of the rectangular members 40 on the second end portion 22. The initial engagement of the first end portion 20 and the second end portion 22 of the bundling strap 10 must be made proximate to the center of the stack of paper recyclables 12 such that the strap 10 is sufficiently taut. Thereafter, the first end portion 20 and the second end portion 22 are engaged repeatedly at a plurality of locations so as to sufficiently lock the strap 10 around the stack of paper recyclables 12. The interengagment of the plurality of rectangular members 34 and 40 is relatively easy to perform when compared to the task of tying a multiplicity of knots in rope or twine.

At such a time, a second identical bundling strap 14 (see FIG. 2) may be extended through the cross-linking slits 42 in the first bundling strap 10 such that the second strap 14 and the first strap 10 are generally perpendicular to one another. Thereafter, the second bundling strap 14 is wrapped around the stack of papers 12 so as to extend over the top of the stack 12. Subsequently, the second bundling strap 14 is locked in the same manner as the first bundling strap 10 so as to securely bundle the stack of paper recyclables 12.

Once bundled, the stack of paper recyclables 12 may be readily lifted by the subject bundling strap 10, and carried to an appropriate curbside collection area. In lifting the stack of paper recyclables 12 by the bundling strap 10, the first and second end portion 20 and 24 of the strap 10 will necessarily pull away from each other under the weight of the stack of paper recyclables 12. However, since the bundling strap 10 is constructed from a biodegradable material having a characteristically high tensile strength and good tear-endurance, the interengaged rectangular members 34 and 40 respectively disposed on the first and second end portions 20 and 22 of the strap 10 will resist shearing and will maintain their structural integrity.

Figure 4:
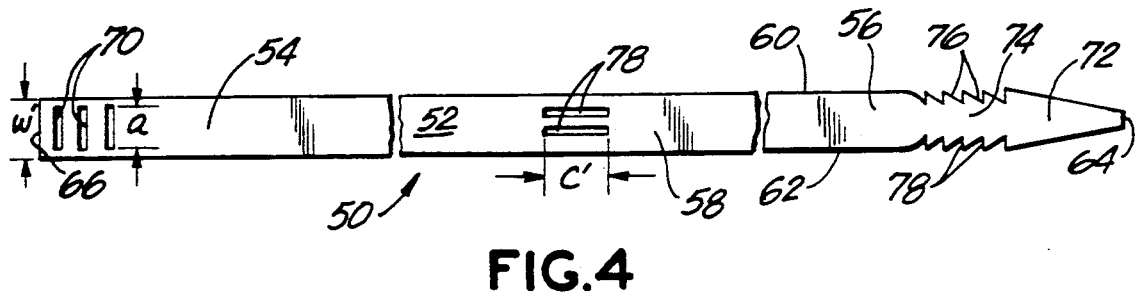
FIG. 4 is a top plan view of an alternate embodiment of the biodegradable bundling strap of the subject invention.
Figure 4A:
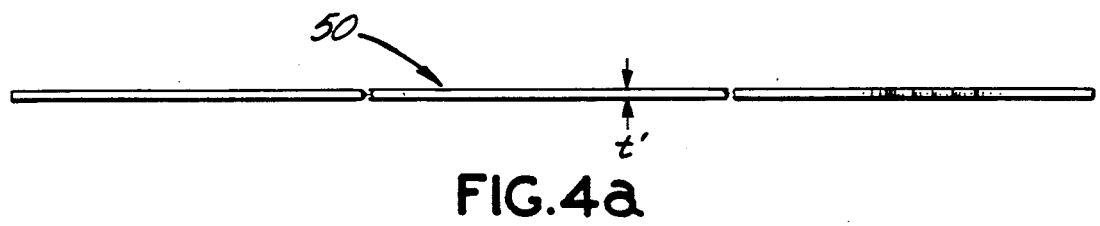
FIG. 4a is a side elevational view of an alternate embodiment of the biodegradable bundling strap of the subject invention.

Turning to FIGS. 4 and 4a, an alternate embodiment of the bundling strap of the subject invention is illustrated and is designated generally by reference numeral 50. The bundling strap 50 comprises an elongated strip of biodegradable material such as fiberboard, linerboard or boxboard, approximately 45.0 inches in length, having a major surface face 52 with a width "w'" that is equal to 1.0 inches which is substantially greater than its thickness "t'". The bundling strap 50 includes a first end portion 54, a second end portion 56 and a center portion 58. The strap 50 further includes opposed lateral edges 60 and 62 and distal ends 64 and 66.

The first end portion 54 of the bundling strap 50 includes a plurality of spaced apart locking slits 70. The locking slits 70 are disposed orthogonal to the longitudinal axis of the elongated strap 50. The slots 70 have a width "a" that is less than the width "w'" of the bundling strap 50.

Opposed lateral edges 60 and 62 of the bundling strap 50 converge at distal end 64 of the second end portion 56 to define a truncated triangular insertion tab 72. Second end portion 56 includes a notched portion 74 having a length which is approximately equal to one third of the total length of the elongated strap 50 and which includes a plurality of opposed generally V-shaped notches 76 and 78. The plurality of generally V-shaped notches 76 extend inwardly from opposed lateral edge 60 of bundling strap 50 to a location intermediate the major surface face 52 thereof. The plurality of generally V-shaped notches 78 extend inwardly from the opposed lateral edge 62 of the bundling strap 50 to a location intermediate major surface face 52 of the bundling strap 50. The notched portion 74 on the second end portion 56 of the bundling strap 50 are intended to engage the locking slots 70 in the second end portion 54 of bundling strap 50.

The center portion 58 of the bundling strap 50 may include a pair of elongated cross-linking slits 80 which are disposed parallel to and equally spaced from the longitudinal axis of the elongated bundling strap 50. The cross-linking slits 80 have a width "c'" that is approximately equal 1.50 inches which is greater than to the width "w'" of the bundling strap 50. The cross-linking slits 80 in bundling strap 50 may be provided so that a second bundling strap 82 may be extended therethrough whereby the first bundling strap 50 and the second bundling strap 82 are generally perpendicular one another (See FIG. 2). Alternatively, the center portion 58 could include a single slit 80 for cross-linking the bundling strap 50 and the second bundling strap 82.

Referring back to FIGS. 1 and 2, in operation, the bundling strap 50 of the subject invention is placed under a stack of paper recyclables 12 such that the center portion 58 is contiguous with the bottom of the stack 12. Thereafter, the first end portion 54 and the second end portion 56 of the bundling strap 50 are wrapped around the stack of papers 12 so that they extend over the top of the stack of papers 12. At such a time, the insertion tab 72 on the second end portion 56 is extended through one of the locking slits 70 in the second end portion 54. Subsequently, the first end portion 56 of the bundling strap 50 is pulled such that the bundling strap 50 is sufficiently taut. Thereupon, the notched portion 74 on the second end portion 58 of the bundling strap 50 is engaged in a locking slot 70.

At such a time, a second identical bundling strap 82 may be extended through the cross-linking slits 80 in the first bundling strap 50 such that the second strap 82 and the first strap 50 would be generally perpendicular to one another (See FIG. 2). Thereafter, the second bundling strap 82 is wrapped around the stack of papers 12 so as to extend over the top of the stack 12. Subsequently, the second bundling strap 82 is locked in the same manner as the first bundling strap 50 so as to securely bundle the stack of paper recyclables 12. Thereafter the stack of paper recyclables 12 may be readily lifted by the alternate embodiment of the subject bundling strap 50 and carried to an appropriate curbside collection area.

In summary, a biodegradable strap for bundling recyclable paper materials is provided comprising an elongated strip of biodegradable material having a first end portion, a second end portion and a central portion. The first end portion and second end portion includes an interlocking means whereby the bundling strap may be secured around a stack of recyclable paper materials. The strap may include a pair of slits in the center portion to receive a second bundling strap therethrough.

While the invention has been described with respect to a preferred embodiment, it is apparent that various changes can be made without departing from the scope of the invention. For example, the cross-linking slits disposed in the center portion can be removed and a single strap may be used to bundle a stack of paper recyclables.

I claim:

1. A strap for bundling a stack of paper recyclables, said strap comprising an elongated strip of biodegradable material of uniform width, said strap having a first end portion, a second end portion and a center portion, said first and second end portions having an interlocking means, said center portion having a pair of spaced apart elongated cross-linking slits disposed parallel to the longitudinal axis of said strap, each of said cross-linking slits having a length that is greater than the width of said strap, whereby the elongated strap is wrapped around a stack of paper recyclables and subsequently the first and second end portions are interlocked and thereafter a second identical strap is extended through said cross-linking slits and similarly locked so as to securely bundle the stack of paper recyclables.

2. A strap as in claim 1 wherein said biodegradable material is fiberboard, boxboard, or linerboard.

3. A strap for bundling a stack of paper recyclables, said strap comprising an elongated strip of biodegradable material of uniform width, said strap having a first end portion, a second end portion, a center portion and first and second opposed edges, said first end portion having a plurality of slots extending inwardly from said first opposed edge, said second end portion having a plurality of slots extending inwardly from said second opposed edge, said center portion having a pair of spaced apart elongated cross-linking slits disposed parallel to the longitudinal axis of said strap, each of said cross-linking slits having a length that is greater than the width of said strap, whereby the elongated strap is wrapped around a stack of paper recyclables and subsequently the first and second end portions are interengaged and thereafter a second identical strap is extended through said cross-linking slits and similarly locked so as to securely bundle the stack of paper recyclables.

4. A strap as in claim 3 wherein said biodegradable material is fiberboard, boxboard or linerboard.

5. A strap as in claim 3 wherein said slots disposed on said first and second end portions are generally rectangular and extend inwardly to the longitudinal axis of said elongated strap and have a width equal to the thickness of said strap.

6. A strap for bundling a stack of paper recyclables, said strap comprising an elongated strip of biodegradable material of uniform width, said strap having a first end portion, a second end portion and a center portion, said first end portion having a plurality of slits disposed orthogonal to the longitudinal axis of said strap, said second end portion having a plurality of notches extending inwardly from the opposed edges of said strap to define a notched portion, said center portion having a pair of spaced apart elongated cross-linking slits disposed parallel to the longitudinal axis of said strap, each of said cross-linking slits having a length that is greater than the width of said strap, whereby the elongated strap is wrapped around a stack of paper recyclables and subsequently the second end portion is extended through a slot in the first end portion such that notched portion is engaged therein and thereafter a second identical strap is extended through said cross-linking slits and similarly locked so as to securely bundle the stack of paper recyclables.

7. A strap as in claim 6 wherein said biodegradable material is fiberboard, boxboard, or linerboard.

8. A strap as in claim 6 wherein said plurality of notches are generally V-shaped.

* * * * *